United States Patent
Lee

(10) Patent No.: US 10,622,165 B2
(45) Date of Patent: Apr. 14, 2020

(54) ELECTRIC ENERGY STORAGE DEVICE HAVING IMPROVED INSTALLATION STRUCTURE OF INTERNAL TERMINAL

(71) Applicant: LS Mtron Ltd., Anyang-si, Gyeonggi-do (KR)

(72) Inventor: Ha-Young Lee, Suwon-si (KR)

(73) Assignee: LS MTRON LTD., Anyang-si, Gyeonggi-do (KR)

( * ) Notice: Subject to any disclaimer, the term of this patent is extended or adjusted under 35 U.S.C. 154(b) by 34 days.

(21) Appl. No.: 15/544,313

(22) PCT Filed: Jan. 8, 2016

(86) PCT No.: PCT/KR2016/000182
§ 371 (c)(1),
(2) Date: Jul. 18, 2017

(87) PCT Pub. No.: WO2016/117863
PCT Pub. Date: Jul. 28, 2016

(65) Prior Publication Data
US 2018/0247773 A1 Aug. 30, 2018

(30) Foreign Application Priority Data
Jan. 19, 2015 (KR) .................. 10-2015-0008805

(51) Int. Cl.
| | | |
|---|---|---|
| *H01G 11/74* | (2013.01) | |
| *H01G 11/82* | (2013.01) | |
| *H01G 4/32* | (2006.01) | |
| *H01G 9/008* | (2006.01) | |
| *H01G 9/08* | (2006.01) | |
| *H01G 9/15* | (2006.01) | |
| *H01G 4/232* | (2006.01) | |
| *H01M 2/02* | (2006.01) | |
| *H01G 11/78* | (2013.01) | |

(52) U.S. Cl.
CPC .............. *H01G 11/74* (2013.01); *H01G 4/232* (2013.01); *H01G 4/32* (2013.01); *H01G 9/008* (2013.01); *H01G 9/08* (2013.01); *H01G 9/151* (2013.01); *H01G 11/78* (2013.01); *H01G 11/82* (2013.01); *H01M 2/022* (2013.01); *Y02E 60/13* (2013.01); *Y02T 10/7022* (2013.01)

(58) Field of Classification Search
CPC ........ H01G 11/74; H01G 11/78; H01G 9/008; H01G 9/08; H01G 11/82; H01M 2/022
See application file for complete search history.

(56) References Cited

U.S. PATENT DOCUMENTS

| | | |
|---|---|---|
| 8,310,809 B2 | 11/2012 | Kitagawa et al. |
| 2011/0235242 A1 | 9/2011 | Oh et al. |
| 2012/0229954 A1 | 9/2012 | Lee et al. |

FOREIGN PATENT DOCUMENTS

| | | |
|---|---|---|
| CN | 202887989 U | 4/2013 |
| CN | 103680999 A | 3/2014 |
| EP | 0924723 A2 | 6/1999 |
| EP | 2133896 A1 | 12/2009 |
| EP | 2 980 818 A1 | 2/2016 |
| JP | H10233233 A | 9/1998 |
| JP | 2007-258414 A | 10/2007 |
| KR | 10-2005-0052220 A | 6/2005 |
| KR | 10-2012-0027665 A | 3/2012 |
| KR | 10-2012-0103990 A | 9/2012 |
| KR | 10-1296224 B1 | 9/2013 |
| KR | 10-1345224 B1 | 12/2013 |
| KR | 20140143641 A | 12/2014 |

OTHER PUBLICATIONS

Search Report, dated Apr. 22, 2016, for International Application No. PCT/KR2016/000182.
Written Opinion, dated Apr. 22, 2016, for International Application No. PCT/KR2016/000182.
Chinese Notice of Allowance and English translation for related Chinese Application No. 201680006147.9; action dated Mar. 4, 2019; (5 pages).

*Primary Examiner* — Ladan Mohaddes
(74) *Attorney, Agent, or Firm* — K&L Gates LLP

(57) ABSTRACT

An electric energy storage device includes a positive electrode internal terminal composed of a plate-shaped terminal body having at least one electrolyte impregnation hole formed therein and a flange, wherein an upper surface of the terminal body and any one surface of the flange come into contact with a cell assembly to couple the positive electrode internal terminal and the cell assembly, wherein a lower surface of the terminal body comes into contact with an inner surface of a lower end of a case, and wherein the flange is pressed by a terminal-fixing beading portion so that the positive electrode internal terminal is fixed in the case.

4 Claims, 8 Drawing Sheets

ELECTRIC ENERGY STORAGE DEVICE HAVING IMPROVED INSTALLATION STRUCTURE OF INTERNAL TERMINAL

CROSS-REFERENCE TO RELATED APPLICATION(S)

The present application is a U.S. National Phase entry from International Application No. PCT/KR2016/000182, filed Jan. 8, 2016, which claims priority to Korean Patent Application No. 10-2015-0008805, filed Jan. 19, 2015, the disclosure of which is incorporated by reference herein in its entirety.

BACKGROUND OF THE INVENTION

1. Field of the Invention

The present disclosure relates to an electric energy storage device, and more particularly, to an electric energy storage device having an internal terminal with an improved installation structure, connected to an electrode of a cell assembly inside a metal case.

2. Description of Related Art

A high capacitance storage device, which is regarded as a next-generation electric energy storage device, includes a ultra-capacitor (UC), a super capacitor (SC), an electric double layer capacitor (EDLC) and the like, which are a kind of capacitor, and it is an energy storage device having an intermediate property between an electrolytic condenser and a secondary battery, which can be used in combination with, or in place of, a secondary battery due to its high efficiency and semi-permanent life span.

The high capacitance storage device is sometimes used in place of a battery for applications which do not ensure easy maintenance and demand long service life. The high capacitance storage device has fast charging/discharging characteristics and thus is very suitable not only as an auxiliary power source for mobile communication information devices such as a mobile phone, a notebook and a PDA but also as a main or auxiliary power source of an electric vehicle, a night road pilot lamp, an uninterrupted power supply (UPS) and the like, which demand high capacity, and is widely used for such purposes.

The high capacitance storage device generally has a cylindrical shape as shown in FIG. 1 for a small size.

Referring to FIG. 1, a high capacitance storage device includes a cell assembly 1 composed of a positive electrode, a negative electrode, a separator and an electrolyte and contained in an inner housing, a metal case 4 accommodating the cell assembly 1, and a negative electrode internal terminal 2 and a positive electrode internal terminal 3 substantially having a plate shape and respectively connected to upper and lower portions of the metal case 4 and connected to a negative electrode and a positive electrode of the cell assembly 1.

The negative electrode inner terminal 2 is insulated against the metal case 4 by an insulation member 6 and simultaneously contacts a top plate 5, and the positive inner terminal 3 is in contact with the metal case 4. Terminal units 8, 9 are generally formed to protrude at a center of the top plate 5 and a bottom center of the metal case 4.

The coupling between the negative electrode internal terminal 2 and the top plate 5 and the coupling between the positive electrode internal terminal 3 and the metal case 4 are usually made by a coupling bolt 7. Here, particularly, the negative electrode internal terminal 2 and the top plate 5 are heavy and bulky, which demands structural improvements.

As an alternative, the negative electrode internal terminal 2 and the positive electrode internal terminal 3 may be coupled to the metal case 4 by performing a beading process to the metal case 4. In this connection, there has been proposed a method in which a predetermined groove (not shown) is formed along the outer circumference of the negative electrode internal terminal 2 and the positive electrode internal terminal 3, and a protruding portion of the metal case 4 protruding inwards is interposed into the groove by means of the beading process performed to the metal case 4, thereby fixing the internal terminal to the metal case 4.

However, in the method of applying a beading process as described above, the groove should be formed at the outer circumference of the internal terminals 2, 3 to correspond to the width of the protruding portion formed by the beading process, and thus there is a limitation in reducing the thickness of the metal case 4, which makes it difficult to expand the inner space of the metal case 4. If the inner space of the metal case 4 is not sufficiently secured, the internal pressure may be increased.

In a high capacitance storage device, a side reaction occurs at an interface between an electrolyte and an electrode when an abnormal operation such as overcharge, overdischarge and overvoltage takes place at room temperature, thereby generating gas as a byproduct. If the gas is generated and accumulated inside, the internal pressure of the metal case 4 continuously increases, and eventually the metal case 4 is swelled convexly or gas is discharged abruptly at a weak portion of the metal case 4 to cause explosion.

In relation to the swelling phenomenon of the metal case 4, a curling portion 10 bent toward the top plate 5 is formed at the upper end of the metal case 4 so that the pressure resistance performance may be easily enhanced by controlling the curling amount. However, in order to enhance the pressure resistance performance, it is very important to sufficiently secure the inner space of the metal case 4. However, there is a limit in improving the pressure resistance performance only by providing the curling portion 10.

SUMMARY OF THE INVENTION

The present disclosure is designed to solve the problems of the related art, and therefore the present disclosure is directed to providing an electric energy storage device in which a structure for installing an internal terminal to a metal case is improved so that an internal terminal with a simplified structure in a thin form may be provided inside the metal case.

The present disclosure is also directed to providing an electric energy storage device having a structure capable of sufficiently reducing an internal pressure of the metal case by sufficiently securing an inner space therein.

The present disclosure is also directed to providing an electric energy storage device having a low resistance characteristic since an outer circumferential end of the internal terminal is closely adhered to an inner wall of the metal case.

In one aspect of the present disclosure, there is provided an electric energy storage device, which includes a positive electrode internal terminal composed of a plate-shaped terminal body having at least one electrolyte impregnation hole formed therein and a flange, wherein an upper surface of the terminal body and any one surface of the flange come into contact with a cell assembly to couple the positive electrode internal terminal and the cell assembly, wherein a lower surface of the terminal body comes into contact with an inner surface of a lower end of a case, and wherein the flange is pressed by a terminal-fixing beading portion so that the positive electrode internal terminal is fixed in the case.

The flange may be formed at an outer circumference of the terminal body to extend upwards.

One surface of the flange may be pressed by the terminal-fixing beading portion, and the other surface of the flange may be supported by the cell assembly, so that the flange is closely adhered and fixed at the inside of the case.

An upper edge of the terminal-fixing beading portion may be located higher than a top end of the flange so that the terminal-fixing beading portion presses the flange.

In another aspect of the present disclosure, there is also provided an electric energy storage device, which includes a positive electrode internal terminal composed of a plate-shaped terminal body having at least one electrolyte impregnation hole formed therein, wherein a lower surface of the terminal body of the positive electrode internal terminal comes into contact with an inner surface of a lower end of a case, and an upper surface edge of the terminal body is pressed by a terminal-fixing beading portion and fixed in the case.

The positive electrode internal terminal may be located between a lower edge of the terminal-fixing beading portion and the inner surface of the lower end of the case.

An upper surface edge or a lower surface edge of the terminal body may be chamfered.

Advantageous Effects

The electric energy storage device according to the present disclosure gives the following effects:

First, since there is no need to form a beading groove at the outer circumference of the internal terminal, the internal terminal may be made in a thinner design in comparison to an existing one.

Second, it is possible to improve the low resistance characteristic by closely adhering the outer circumferential end of the internal terminal to the inner wall of the metal case in an easy way.

Third, since the positive electrode internal terminal may be arranged so that the flange faces upwards, the inner space of the metal case may be more widely secured and thus the electric energy storage capacity may be increased.

Fourth, since the structure of the internal terminal may be simplified into a thin plate form, the internal terminal may be manufactured by press working, and thus its manufacturing cost may be reduced.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE INVENTION

Figure 1:
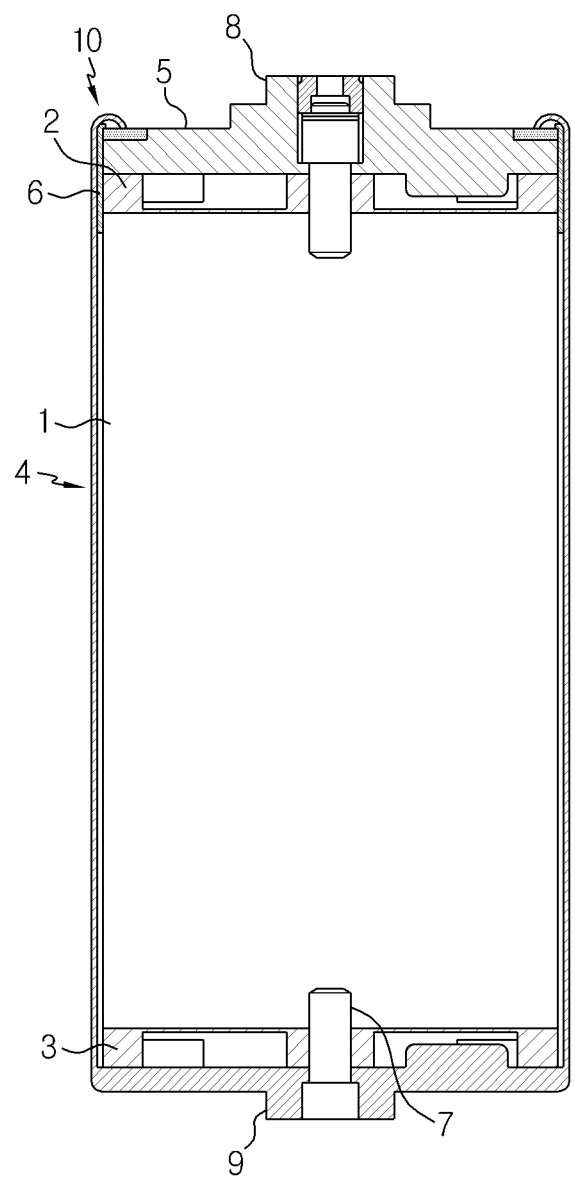
FIG. 1 is a cross-sectional view showing an electric energy storage device of an existing technique.
Figure 2:
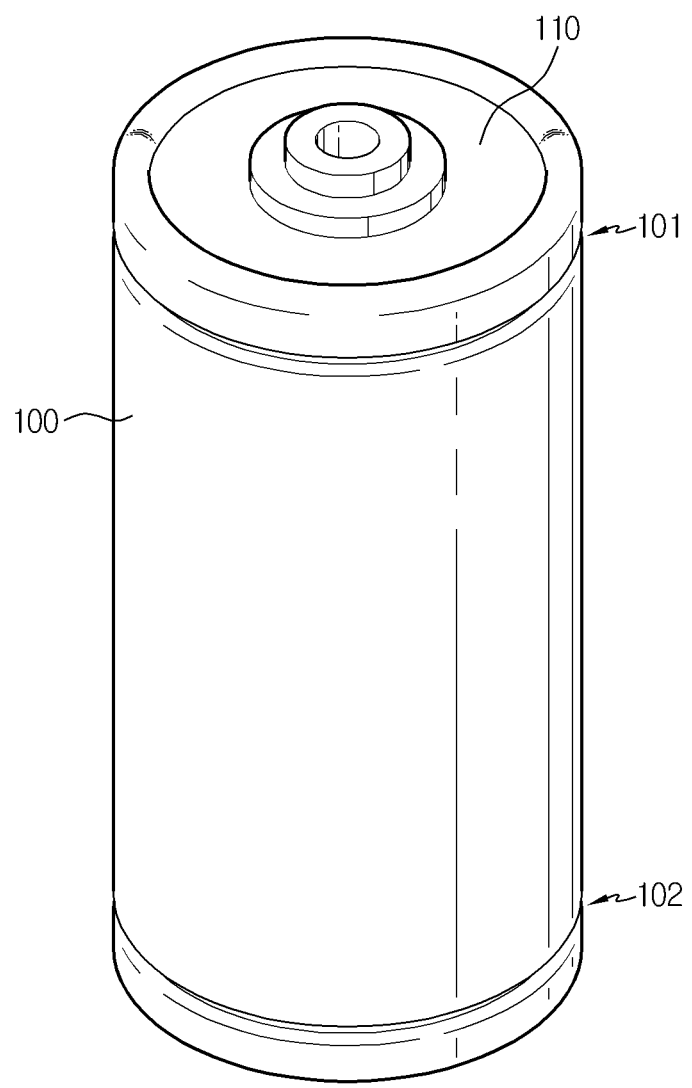
FIG. 2 is a perspective view showing an appearance of an electric energy storage device according to an embodiment of the present disclosure.
Figure 3:
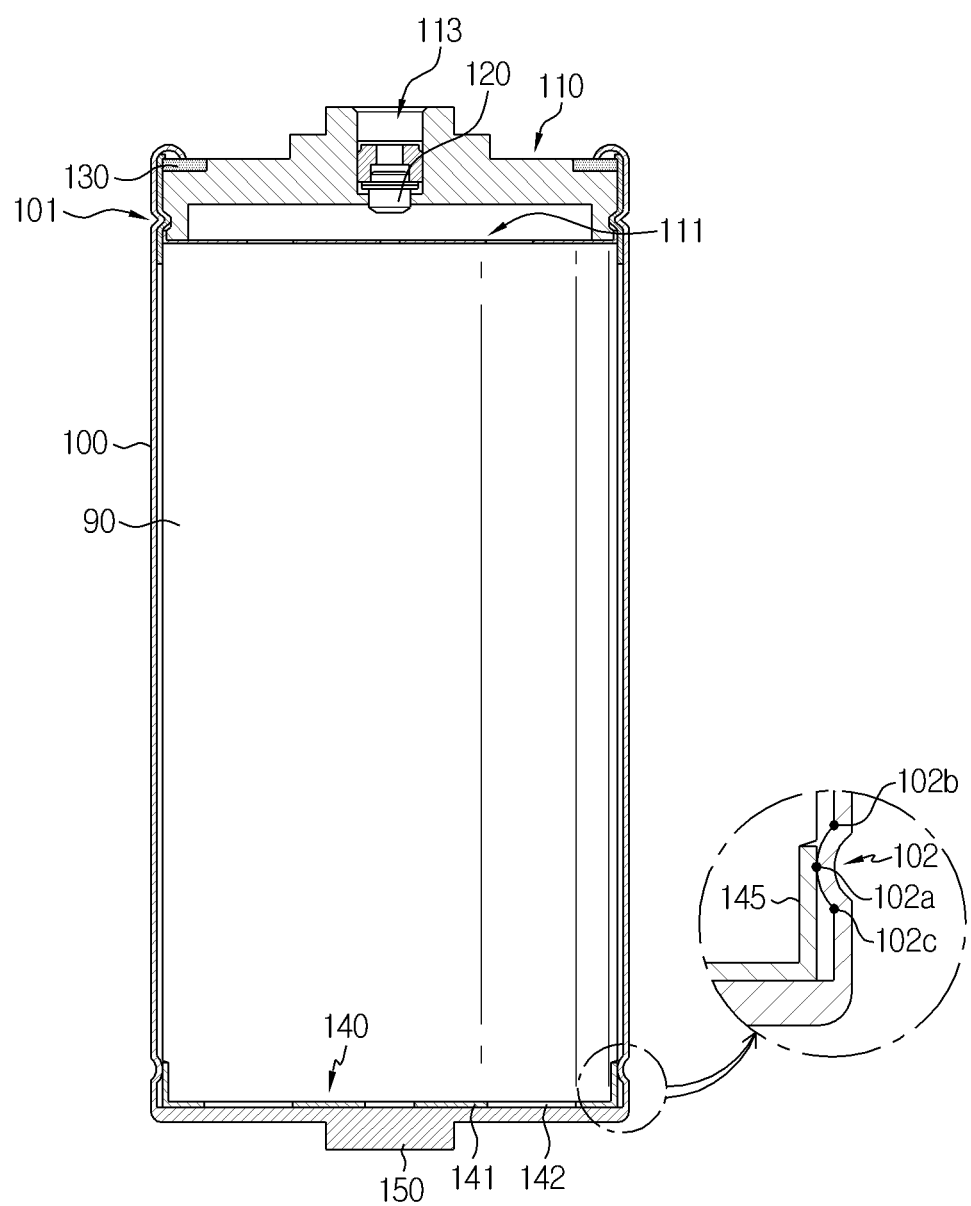
FIG. 3 is a partially enlarged sectional view of FIG. 2.

FIG. 2 is a perspective view showing an appearance of an electric energy storage device according to an embodiment of the present disclosure, and FIG. 3 is a cross-sectional view an assembled state of FIG. 2.

Referring to FIGS. 2 and 3, an electric energy storage device according to an embodiment of the present disclosure includes a cell assembly 90, a cylindrical metal case 100 accommodating the cell assembly 90, a negative electrode external terminal 110 located at an upper portion of the metal case 100, a negative electrode internal terminal 111 disposed at an inner side of the negative electrode external terminal 110 and connected to a negative electrode of the cell assembly 90, a positive electrode external terminal 150 provided at one end of the metal case 100, a positive electrode internal terminal 140 disposed at an inner side of the positive electrode external terminal 150 and connected to a positive electrode of the cell assembly 90, and a terminal-fixing beading portion 101, 102 formed at the metal case 100 to provide a terminal fixing function.

The cell assembly 90 includes a positive electrode, a negative electrode, a separator and an electrolyte to provide an electrochemical energy storage function. As the cell assembly 90, a normal jelly-roll cell may be employed.

The metal case 100 includes a cylindrical body having an inner space capable of accommodating the cell assembly 90 which is processed as a wound element and contained in a predetermined inner housing. Preferably, the metal case 100 may be provided as an aluminum cylinder. In addition, a lower end portion closing the cylindrical body is formed at any one of the upper surface and the lower surface of the cylindrical body. Thus, due to the structure of the metal case 100 including the cylindrical body and the lower end portion, the cell assembly 90 may be accommodated. In addition, the positive electrode external terminal 150 protruding outwardly is formed at a portion of the lower end portion.

The negative electrode external terminal 110 caps the upper end of the metal case 100 and gives a current path. The negative electrode external terminal 110 has a circular outer circumferential surface corresponding to the inner circumferential surface of the metal case 100, and its upper and lower surfaces shape may be configured with various three-dimensional shapes. The edge of the negative electrode external terminal 110 is adjacent to the curling portion with an insulating member 130 being interposed therebetween.

A thorough hole 113 extending in a thickness direction is formed at the center of the negative electrode external terminal 110. The thorough hole 113 is used, for example, as a space for installing an automatic reset safety valve 120 as well as a path for injecting an electrolyte and an air vent for vacuum operation.

The negative electrode external terminal 110 is fixed to the metal case 100 by beading the metal case 100. Accordingly, the terminal-fixing beading portion 101 is formed at a side of the metal case 100 corresponding to the negative electrode external terminal 110.

The negative electrode internal terminal 111 is disposed at a lower portion of the negative electrode external terminal 110 and connected to the negative electrode of the cell assembly 90.

The positive electrode internal terminal 140 is fixed to the cell assembly 90 such that the upper surface of the terminal body 141 of the positive electrode internal terminal 140 and a part of the flange 145 come into contact with the cell assembly 90. The positive electrode internal terminal 140 is disposed inside the metal case 100 so that the lower surface thereof contacts the inner side of the lower end of the metal case 100, thereby contacting the positive electrode external terminal 150. Also, the upper surface of the positive electrode internal terminal 140 is connected to the positive electrode of the cell assembly 90. The inner side of the lower end of the metal case 100 forms an inner bottom surface of the metal case 100.

Figure 4:
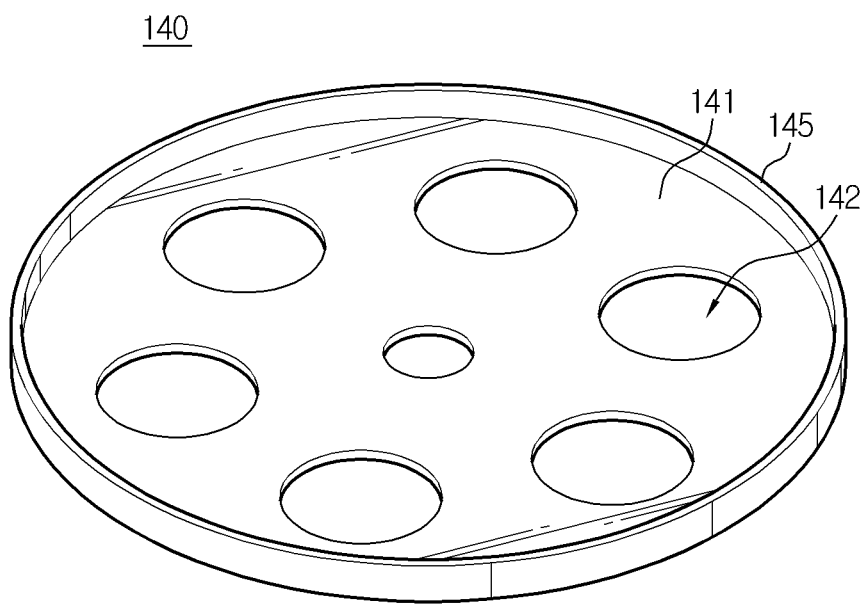
FIG. 4 is a perspective view showing a positive electrode internal terminal depicted in FIG. 3.

As shown in FIG. 4, the positive electrode internal terminal 140 has a thin and flat plate-shaped terminal body 141, a flange 145 formed by extending an outer circumferential end of the terminal body 141 upwards, perpendicular to a plane of the terminal body 141, and a plurality of electrolyte impregnation holes 142 formed in the terminal body 141. The positive electrode internal terminal 140 is fixed to the metal case 100 by pressing the flange 145 by means of a terminal-fixing beading portion 102 protruding to the inside of the metal case 100.

The terminal body 141 has a circular outer periphery, but is made of a thin plate-shaped body having no groove in the outer circumference thereof, unlike an existing internal terminal fixed to a metal case by a beading process. The terminal body 141 is disposed to make a surface contact with the inner side of the lower end of the metal case 100.

The electrolyte impregnation holes 142 are formed to penetrate the terminal body 141 in the thickness direction so as to provide a passage for a liquid electrolyte during an electrolyte injection process. For uniform movement of the electrolyte, the plurality of electrolyte impregnation holes 142 may be mostly formed at regular intervals along the circumferential direction of the terminal body 141, and one of them may be formed at the center of the terminal body 141.

The positive electrode internal terminal 140 is fixed in the metal case 100 by means of the terminal-fixing beading portion 102, which is formed at the lower side of the metal case 100 by a beading process, and the cell assembly 90. When the beading process is completed, the positive electrode internal terminal 140 is fixed firmly in the metal case 100 since the flange 145 is pressed by the terminal-fixing beading portion 102 protruding into the metal case 100.

Specifically, one surface of the flange 145 is pressed by a protruding portion of the terminal-fixing beading portion 102 and the other surface of the flange 145 is supported by the cell assembly 90, thereby closely fixing the positive electrode internal terminal 140 to the inside of the metal case 100. For effective pressing and fixing, the terminal-fixing beading portion 102 may be designed to have an upper edge 102*b* higher than the top end of the flange 145. Here, the upper edge 102*b* and the lower edge 102*c* of the terminal-fixing beading portion 102 are positions where the terminal-fixing beading portion 102 begins to protrude from the inner surface of the metal case 100, which respectively correspond to the upper end and the lower end of the groove portion of the terminal-fixing beading portion 102.

Figure 5:
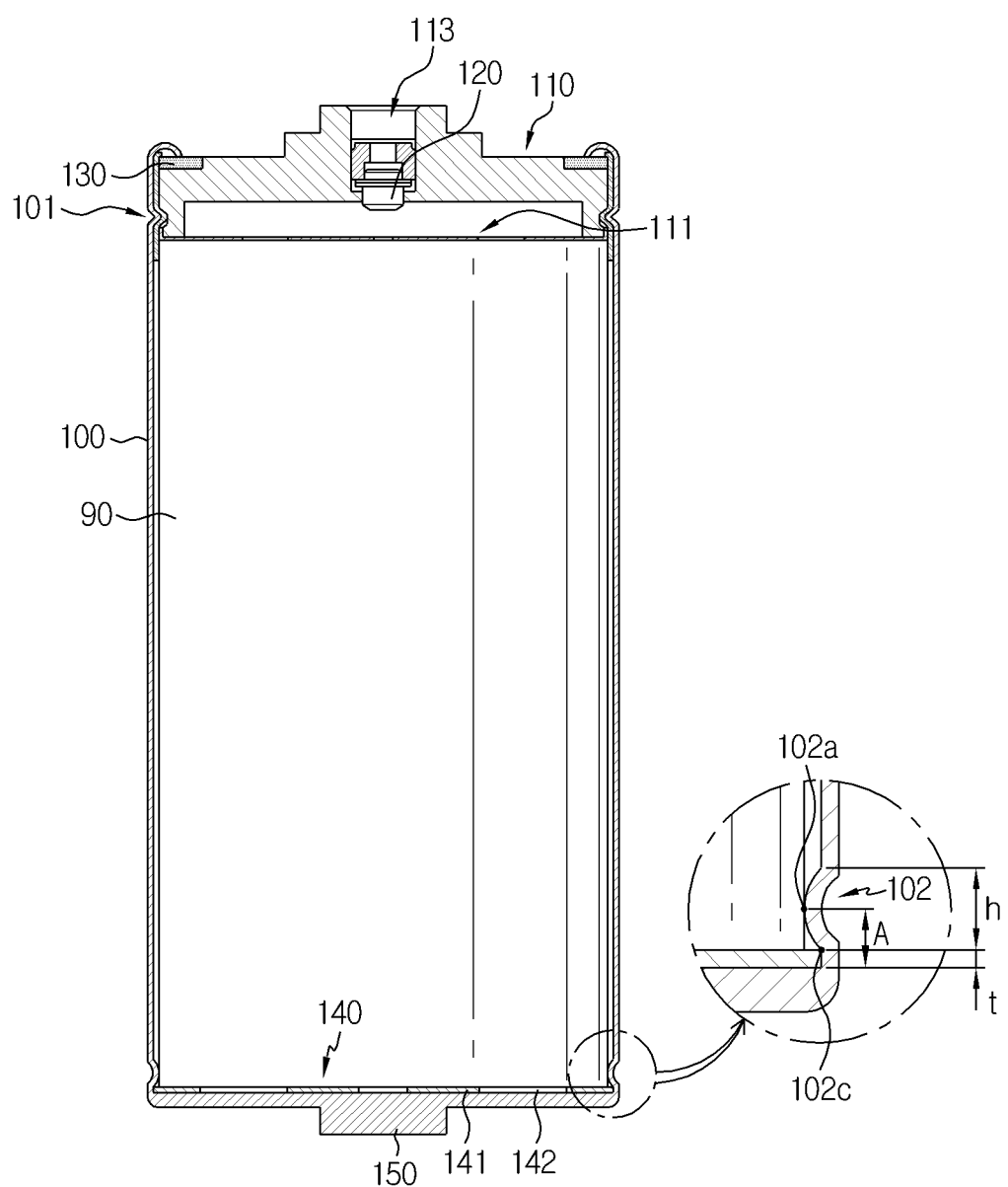
FIG. 5 is a partially enlarged sectional view showing an electric energy storage device according to another embodiment of the present disclosure.
Figure 6:
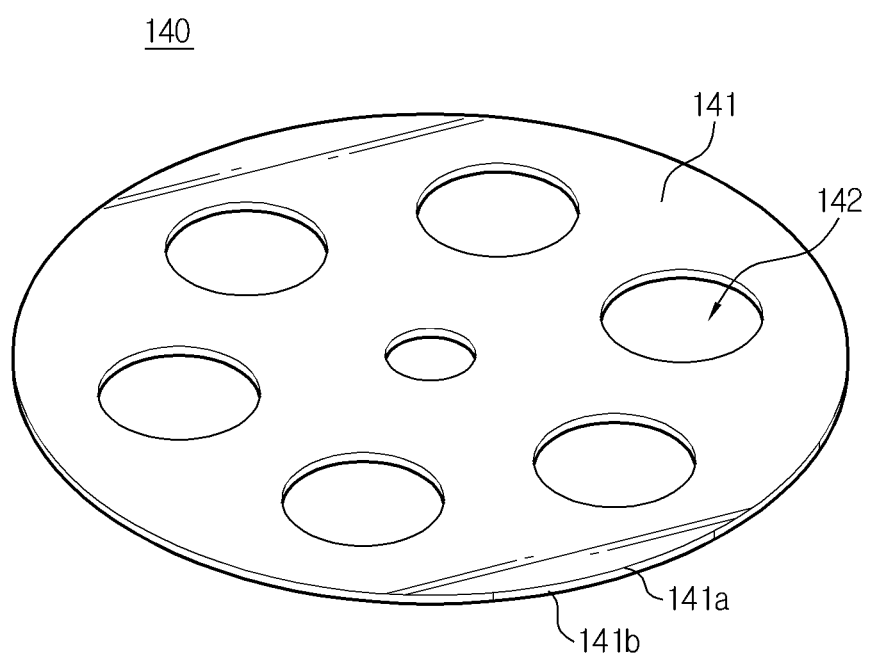
FIG. 6 is a perspective view showing a positive electrode internal terminal depicted in FIG. 5.

FIG. 5 shows an electric energy storage device according to another embodiment of the present disclosure, and FIG. 6 shows a positive electrode internal terminal depicted in FIG. 5 in more detail. As shown in the figures, the positive electrode internal terminal 140 is composed of a thin plate-shaped body having a circular outer periphery, and the positive electrode internal terminal 140 is disposed in a region A between a protruding end 102*a* of the terminal-fixing beading portion 102 and the inner side of the lower end of the metal case 100 serving as an internal terminal supporting surface and fixed by the terminal-fixing beading portion 102. At this time, the lower surface of the terminal body 141 of the positive electrode internal terminal 140 comes into contact with the inner side of the lower end of the metal case 100, and an upper surface edge 141*a* of the terminal body 141 is pressed by the terminal-fixing beading portion 102 and fixed inside the metal case 100. A lower surface edge 141*b* is provided at an opposite side of the upper surface edge 141*a* of the terminal body 141. Here, the positive electrode internal terminal 140 may be disposed between the second edge 102*c* of the terminal-fixing beading portion 102 and the inner side of the lower end of the metal case 100.

If the positive electrode internal terminal 140 is disposed between the second edge 102*c* of the terminal-fixing beading portion 102 and the inner side of the lower end of the metal case 100, the positive electrode internal terminal 140 is designed to have a thickness t equal to the height between the second edge 102*c* of the terminal-fixing beading portion 102 and the inner side of the lower end of the metal case 100. Thus, the positive electrode internal terminal 140 has a thin design, and the flow in a vertical direction may be effectively prevented.

Figure 7:
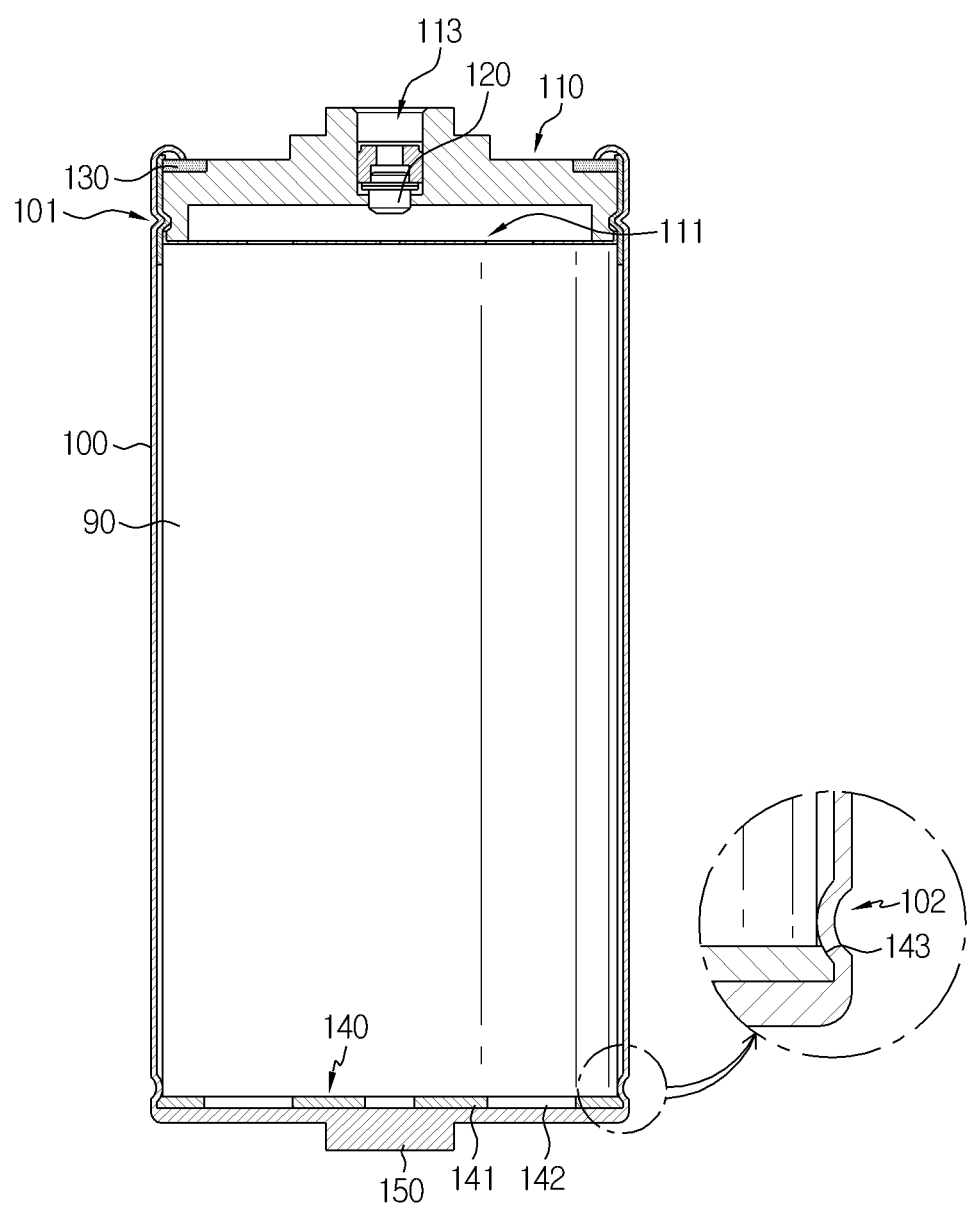
FIG. 7 is a sectional view and a partially enlarged sectional view showing a modified example of the positive electrode internal terminal depicted in FIG. 5 at which an upper surface edge is chamfered.

FIG. 7 shows a modified example of the positive electrode internal terminal depicted in FIG. 5. As shown in FIG. 7, the upper surface edge of the positive electrode internal terminal 140 may chamfered at C1.8 or more or rounded at R1.5 or more to allow the positive electrode internal terminal 140 be seated at the inside of the metal case 100 and to improve the contact reliability.

Figure 8A:
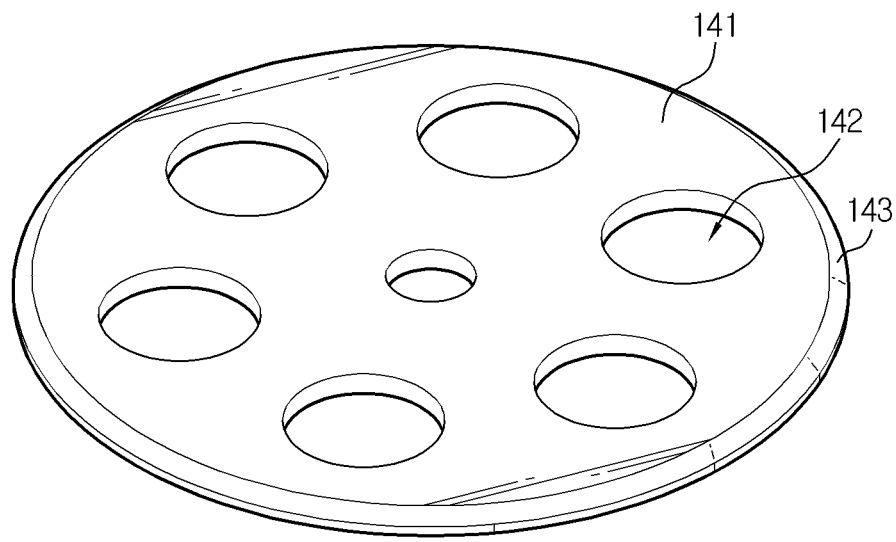
FIG. 8a is a perspective view showing a positive electrode internal terminal depicted in FIG. 7.

In this regard, FIG. 8*a* shows an example in which the upper surface edge 141*a* of the positive electrode internal terminal 140 is chamfered. As shown in FIG. 8A, if the upper surface edge 141*a* of the positive electrode internal terminal 140 is chamfered to form a first curved portion 143, during the beading process for fixing the positive electrode internal terminal 140 in the metal case 100, it is possible to prevent the inner surface of the metal case 100 from being damaged or broken by the upper surface edge 141*a* of the positive electrode internal terminal 140. In addition, the contact area between the positive electrode internal terminal 140 and the terminal-fixing beading portion 102 is widened, thereby securely fixing the positive electrode internal terminal 140 in the metal case 100.

Figure 8B:
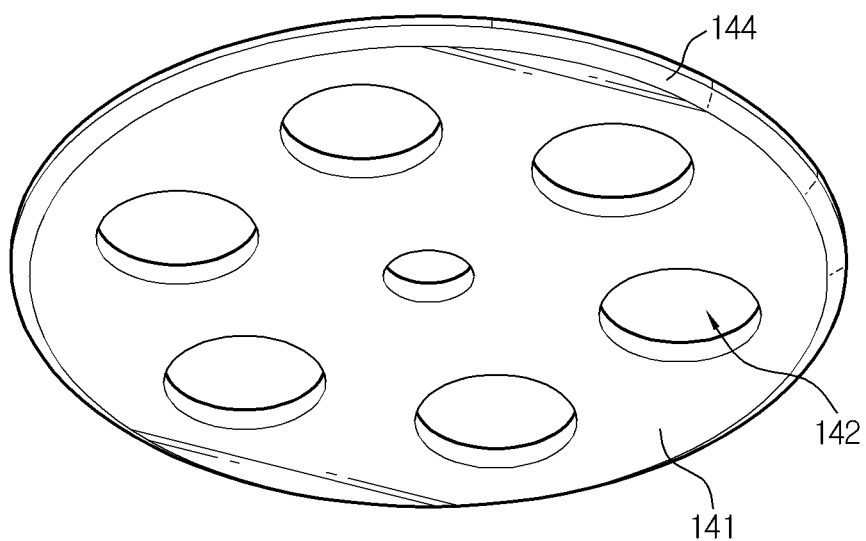
FIG. 8b is a perspective view showing a modified example of the positive electrode internal terminal depicted in FIG. 8a at which a lower surface edge is chamfered.

Also, FIG. 8A shows an example in which the lower surface edge 141*b* of the positive electrode internal terminal 140 is chamfered. As shown in FIG. 8*b*, if the lower surface edge 141*b* of the positive electrode internal terminal 140 is chamfered to form a second curved portion 144, it is possible to prevent that the positive electrode internal terminal 140 is pushed upwards by the inner edge where the side surface of the metal case 100 meets the inner side of the lower end thereof and thus causes contact inferiority with the bottom surface of the metal case 100.

Therefore, as shown in FIG. 8*a*, the upper surface edge 141*a* of the positive electrode internal terminal 140 may be chamfered and applied to an energy storage device, or as shown in FIG. 8*b*, the lower surface edge 141*b* of the positive electrode internal terminal 140 may be chamfered and applied to an energy storage device. Also, the positive electrode internal terminal 140 in which the upper surface edge 141*a* and the lower surface edge 141*b* are chamfered may also be applied to an energy storage device.

As described above, in the electric energy storage device according to an embodiment of the present disclosure, in a state where the positive electrode internal terminal 140 is disposed at the inner side of the lower end of the metal case 100, the positive electrode internal terminal 140 may be conveniently fixed to the metal case 100 by performing a beading process at the outside of the metal case 100 in accordance with the height of the flange 145 of the positive electrode internal terminal 140 or the height of the terminal body 141. At this time, since the flange 145 or the upper surface edge 141*a* is pressed by the terminal-fixing beading portion 102 protruding into the metal case 100 by the beading process, the positive electrode internal terminal 140 may be firmly fixed to the inner surface of the metal case 100 even though a beading groove is not separately formed at the outer circumference thereof.

By using the above arrangement, the positive electrode internal terminal 140 may be manufactured in a thin shape with a simple structure compared with the existing structure, and thus the inner space of the metal case 100 may be sufficiently secured. Accordingly, the internal pressure of the metal case 100 may be lowered, and thus the stability and life span of the electric energy storage device may be improved. In addition, the low resistance characteristic may be improved by bringing the positive electrode internal terminal 140 into close contact with the periphery of the terminal-fixing beading portion 102 with a wide contact area.

The present disclosure has been described in detail. However, it should be understood that the detailed description and specific examples, while indicating preferred embodiments of the disclosure, are given by way of illustration only, since various equivalents and modifications within the scope of the disclosure will become apparent to those skilled in the art from this detailed description.

INDUSTRIAL APPLICABILITY

If the present disclosure is applied, it is possible to make a high capacitance storage device with a small and light design, and it is also possible to shorten the time required for the electrolyte impregnation process. Moreover, by sufficiently securing the inner space of the high capacitance storage device to lower the pressure resistance, it is possible to improve the stability and life span.

What is claimed is:

1. An electric energy storage device, which includes a positive electrode internal terminal comprising a plate-shaped terminal body having at least one electrolyte impregnation hole formed therein and a flange,
    wherein an upper surface of the plate-shaped terminal body and any one surface of the flange come into contact with a cell assembly to couple the positive electrode internal terminal and the cell assembly,
    wherein a lower surface of the plate-shaped terminal body comes into contact with an inner surface of a lower end of a case,
    wherein the flange is flat and a thickness of the case is constant,
    wherein a portion of the flange contacts a terminal-fixing beading portion formed at the case, and the other portion of the flange is spaced apart from the inner side of the case, and the portion of the flange is pressed by the terminal-fixing beading portion so that the positive electrode internal terminal is fixed in the case,
    wherein the flange is formed at an outer circumference of the plate-shaped terminal body to extend upwards from the plate-shaped terminal body in a direction toward the cell assembly, and
    wherein a beading groove is formed only at the case.

2. The electric energy storage device according to claim 1, wherein one surface of the flange is pressed by the terminal-fixing beading portion, and the other surface of the flange is supported by the cell assembly, so that the flange is closely adhered and fixed at the inside of the case.

3. The electric energy storage device according to claim 1, wherein an upper edge of the terminal-fixing beading portion is located higher than a top end of the flange so that the terminal-fixing beading portion presses the flange.

4. The electric energy storage device according to claim 1, wherein a portion of the cell assembly is accommodated and coupled to inner space of the positive electrode internal terminal.

* * * * *